(No Model.)
M. L. BERGMAN.
ROAD CART.
No. 341,216. Patented May 4, 1886.
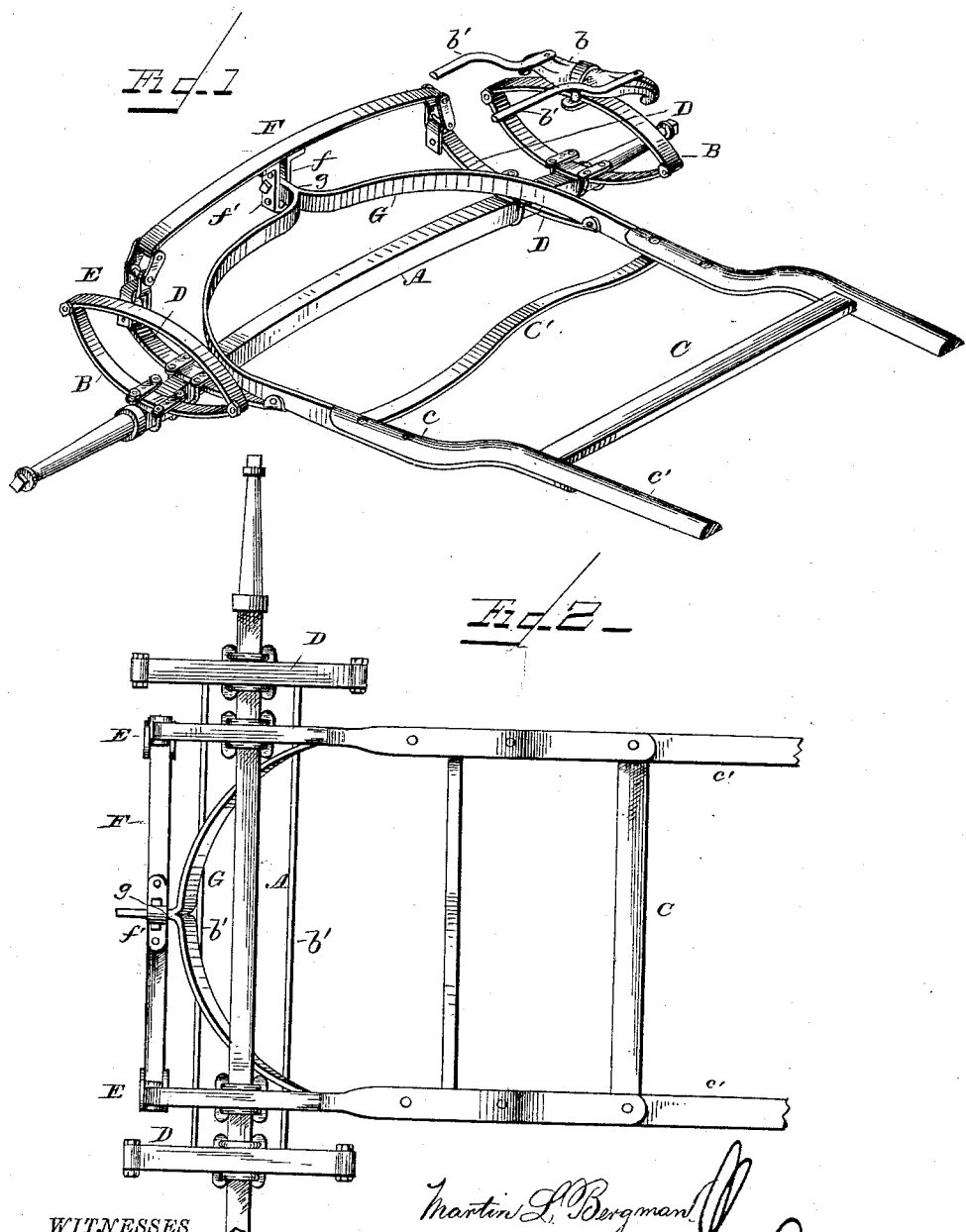

UNITED STATES PATENT OFFICE.

MARTIN L. BERGMAN, OF BUENA VISTA, OREGON.

ROAD-CART.

SPECIFICATION forming part of Letters Patent No. 341,216, dated May 4, 1886.

Application filed January 28, 1886. Serial No. 190,076. (No model.)

*To all whom it may concern:*

Be it known that I, MARTIN L. BERGMAN, a citizen of the United States of America, residing at Buena Vista, in the county of Polk and State of Oregon, have invented certain new and useful Improvements in Road-Carts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in running-gear for road-carts or two-wheeled vehicles, the object of the same being to provide a means whereby the draft motion will be overcome and an easy-riding vehicle provided.

In the accompanying drawings, which illustrate my invention, Figure 1 is a perspective view of the running-gear, and Fig. 2 is a plan view.

A represents the axle, which is of any ordinary construction, and has attached adjacent to the axle-skeins elliptical springs B. Said springs are provided at their upper ends with blocks $b$, which are attached thereto by means of clips. To the ends of the blocks are secured upwardly-bent rods $b'$, to which is secured the body of the vehicle.

The front end of the vehicle is provided with straps or springs, which are secured to the cross-bar of the thill. A curved spring, $C'$, is also attached to the body and to the ends of the thills or shafts.

The axle A has clipped thereon semi-elliptic springs D, the rear ends of which are turned upon themselves, so as to form eyes for the reception of a universal connecting-link, E, said universal connecting-link being secured at its upper ends to eyes formed in the ends of a cross-spring, F, said cross-spring being provided centrally with a downwardly-projecting loop, $f$, which is provided with a series of perforations, $f'$.

The ends of the thills or shafts are connected to each other by converging bars G, which are connected to each other centrally, and provided with a rearwardly-projecting portion, $g$, which portion is perforated, so that a bolt may pass through the same for pivotally connecting the same to the depending portion of the spring F.

The semi-elliptic springs D have their forward ends turned up so as to form vertical ears, which are perforated, and the converging bars G are secured thereto by means of suitable bolts.

The rear ends of the thills are bent downwardly, so that their main portion will be located above the axle and on a line with the draft, this construction allowing a body the front portion of which is sunk or depressed to be employed.

The downwardly-bent portions of the thills are indicated by $c$, while the front portions, $c'$, are of the ordinary shape.

I claim—

1. In a running-gear for two-wheeled vehicles, the combination of an axle having elliptical springs attached thereto, which serve as a support for the rear portion of the vehicle, the thills having converging bars secured thereto, said bars being attached to a cross-spring and to the forward ends of semi-elliptic springs, said semi-elliptic springs being also connected to the axle and rear cross-spring, substantially as shown, and for the purpose set forth.

2. In a running-gear for two-wheeled vehicles, the combination of the thills, which are connected to each other by rearwardly-converging bars, said bars being connected to a cross-spring having universal couplings connected thereto, and to semi-elliptic springs which are attached to the axle and connected to the converging bars G adjacent to the ends of the thills, substantially as shown, and for the purpose set forth.

3. The thills or shafts having a downwardly-bent portion in front of the axle, said thills being connected to each other at their rear ends by a converging bar which is pivotally attached to a cross-spring, substantially as shown, and for the purpose set forth.

4. In a village-cart, a continuous thill which is bent downwardly in front of the axle, and provided with a rearwardly-extending portion which is adjustably connected to a cross-spring, said cross-spring being connected by universal couplings to the rear end of semi-elliptic springs, the forward ends of semi-elliptic springs being pivotally attached to the converging bars G of the axle, said semi-elliptic springs being centrally attached to the axle, the parts being combined and organized substantially as shown, and for the purpose set forth.

In testimony whereof I affix my signature in presence of two witnesses.

MARTIN L. BERGMAN.

Witnesses:
W. E. WILCOX,
M. L. MILLER.